(12) United States Patent
Griffin

(10) Patent No.: US 12,028,447 B2
(45) Date of Patent: *Jul. 2, 2024

(54) BRAIN-ACTUATED CONTROL AUTHENTICATED KEY EXCHANGE

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,537

(22) Filed: Apr. 17, 2023

(65) Prior Publication Data

US 2023/0336333 A1    Oct. 19, 2023

Related U.S. Application Data

(63) Continuation of application No. 17/244,295, filed on Apr. 29, 2021, now Pat. No. 11,664,980, which is a continuation of application No. 16/121,342, filed on Sep. 4, 2018, now Pat. No. 10,999,066.

(51) Int. Cl.
*H04L 9/08* (2006.01)
*H04L 9/32* (2006.01)
*H04L 9/40* (2022.01)

(52) U.S. Cl.
CPC .......... *H04L 9/0844* (2013.01); *H04L 9/3231* (2013.01); *H04L 9/3271* (2013.01); *H04L 63/0435* (2013.01); *H04L 63/061* (2013.01); *H04L 63/083* (2013.01); *H04L 63/0869* (2013.01); *H04L 2463/082* (2013.01)

(58) Field of Classification Search
CPC ... H04L 9/0844; H04L 9/3231; H04L 9/3271; H04L 63/0435; H04L 63/061; H04L 63/083; H04L 63/0869; H04L 2463/082; H04L 9/0863; H04L 63/0861; G06F 21/32; H04W 12/06

See application file for complete search history.

(56) References Cited

U.S. PATENT DOCUMENTS 9,032,501 B1    5/2015  Martin et al.
9,539,118 B2    1/2017  Leuthardt et al.
9,672,760 B1    6/2017  Breuer et al.
(Continued)

FOREIGN PATENT DOCUMENTS

WO    WO-2022/113131 A1    6/2022

OTHER PUBLICATIONS

Akhila et al, "A New Cryptographic Key Generation Scheme Using Psychological Signals", 2016, Global Colloquium in Recent Advancement and Effectual Researches in Engineering, Science and Technology (RAEREST 2016), pp. 286-292.

(Continued)

*Primary Examiner* — Christopher A Revak
(74) *Attorney, Agent, or Firm* — Foley & Lardner LLP

(57) ABSTRACT

A method includes extracting, by a computing system, movement intentions of an individual from neural signals; mapping, by a secure element of the computing system, the movement intentions to a character string; and generating, by the computing system, a symmetric encryption key using the character string as an input to a key exchange protocol.

20 Claims, 2 Drawing Sheets

(56) References Cited

U.S. PATENT DOCUMENTS

| | | | |
|---|---|---|---|
| 10,223,633 B2 | 3/2019 | Breuer et al. | |
| 10,706,134 B2 | 7/2020 | Furman et al. | |
| 10,999,066 B1 | 5/2021 | Griffin | |
| 11,664,980 B1 * | 5/2023 | Griffin | H04L 9/0863 713/171 |
| 2009/0063866 A1 | 3/2009 | Navratil et al. | |
| 2013/0294642 A1 * | 11/2013 | Wang | G06F 16/748 382/118 |
| 2014/0228701 A1 | 8/2014 | Chizeck et al. | |
| 2016/0103487 A1 | 4/2016 | Crawford et al. | |
| 2019/0332751 A1 | 10/2019 | Brady et al. | |
| 2021/0294884 A1 | 9/2021 | Lasser et al. | |
| 2022/0013221 A1 | 1/2022 | Chauhan et al. | |

OTHER PUBLICATIONS

Bajwa, "Neurokey: Towards a new paradigm of cancelable biometrics-based key generation using electroencephalograms", Jun. 15, 2016, Department of Computer Science and Engineering, University of North Texas, Computers & Security 62, pp. 95-113.

Bhattacharya, S. (2016). Optimization of Electroencephalograph-Based Classification for Imaginary Motion Brain Computer Interface Study. 49 pages.

Chen, "A Primer on Neural Signal Processing", Feb. 13, 2017, IEEE Circuits and Systems Magazine, pp. 33-50.

Damaševilius et al., "Research Article Combining Cryptography with EEG Biometrics", May 22, 2018, Hindawi Computational Intelligence and Neuroscience vol. 2018, Article ID 1867548, pp. 1-12.

Griffin, "Biometric Knowledge Extraction for Multi-Factor Authentication and Key Exchange," 2015, Complex Adaptive Systems, Publication 5, pp. 1-6.

Griffin, "Thought-Based Authenticated Key Exchange," 2019, Griffin Information Security, pp. 1-8.

Griffin, Phillip H., "Adaptive Weak Secrets for Authenticated Key Exchange", 8th International Conference on Applied Human Factors and Ergonomics, 2017. 10 pages.

Griffin, Phillip H., "Transport Layer Secured Password-Authenticated Key Exchange", 36-IDDA Journal, Jun. 2015. 6 pages.

Guger, Christoph; "Brain Computer Interface for Virtual Reality Control", g-tec Guger Technologies. 91 pages, no dated provided.

Jayarathne et al., "BrainID: Development of an EEG-Based Biometric Authentication System", 2016 IEEE. 6 pages.

LaFleur et al., "Quadcopter control in three-dimensional space using a noninvasive motor imagery-based brain-computer interface" Journal of neural engineering, 10(4), 2013. 16 pages.

Makeig et al., "A natural basis for efficient brain-actuated control", IEEE Transactions on Rehabilitation Engineering, 8(2), 208-211, no date provided.

Nguyen et al, "On the Study of EEG-based Cryptographic Key Generation", 2017, Science Direct, p. 936-945.

Pham et al., "Multi-factor EEG-based User Authentication", 2014 International Joint Conference on Neural Networks (IJCNN), Jul. 6-11, 2014 Beijing China. 6 pages.

Tukceanu, Violeta; "Comprehensive Brainwave Authentication Using Emotional Stimuli", 20th European Signal Processing Conference (EUSIPCO 2012); August 27031, 2012. 5 pages.

* cited by examiner

BRAIN-ACTUATED CONTROL AUTHENTICATED KEY EXCHANGE

CROSS REFERENCES

The present application is a continuation of U.S. patent application Ser. No. 17/244,295, entitled "BRAIN-ACTUATED CONTROL AUTHENTICATED KEY EXCHANGE," filed Apr. 29, 2021, which is a continuation of U.S. Pat. No. 10,999,066, entitled "BRAIN-ACTUATED CONTROL AUTHENTICATED KEY EXCHANGE," filed Sep. 4, 2018, the entire contents of which are incorporated herein and for all purposes.

BACKGROUND

Access control systems may use one or more authentication factors to verify an individual's identity. For example, authentication factors may include "something-you-know," "something-you-have," and "something-you-are." Some access control systems may require elements from two or three of these categories to provide two- or three-factor authentication.

A brain-computer interface ("BCI") is a direct communication pathway between an individual's brain and an external device, such as a motorized wheelchair or a prosthetic limb, that enables signals from the brain to control the device. An individual's intentions are extracted from data collected using BCI techniques, such as using electroencephalograph ("EEG") sensors either remotely applied or directly attached to an individual.

Password Authenticated Key Exchange ("PAKE") is a protocol that ensures mutual authentication of at least two parties in the act of establishing a symmetric cryptographic key via a Diffie-Hellman key exchange. The use of Diffie-Hellman exchange ensures forward secrecy, which is a property of a key establishment protocol that guarantees that compromise of a session key or long-term private key after a given session does not cause the compromise of any earlier session. With PAKE, the authentication credential exchange is protected from man-in-the-middle and phishing attacks. Authentication using PAKE relies on a pre-shared weak secret (e.g., password), which is protected from (e.g., remains unrevealed to) an eavesdropper, thereby preventing an off-line dictionary attack. Therefore, PAKE allows remote communicating parties to establish a secure communication channel without the need to rely on any external trusted parties.

SUMMARY

Various embodiments relate to methods for mutual authentication using a brain-actuated control authentication key exchange ("BACAKE") system. An example method includes receiving neural signals from a BCI coupled to an individual. Physical movement intentions of the individual are extracted from the neural signals. The physical movement intentions are mapped to a character string representing a knowledge factor. A secure, mutually authenticated communication channel is established between the BACAKE computing system and a provider computing system by using the knowledge factor as an input to a PAKE protocol.

Various other embodiments relate to a system for mutual authentication using a BACAKE computing system. An example system includes a feature extraction circuit configured to extract physical movement intentions of an individual from neural signals received from a BCI coupled to the individual. A mapping circuit is structured to map the physical movement intentions to a character string representing a knowledge factor. A PAKE circuit is structured to establish a secure, mutually authenticated communication channel between the BACAKE computing system and a provider computing system by using the knowledge factor as an input to a PAKE protocol.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
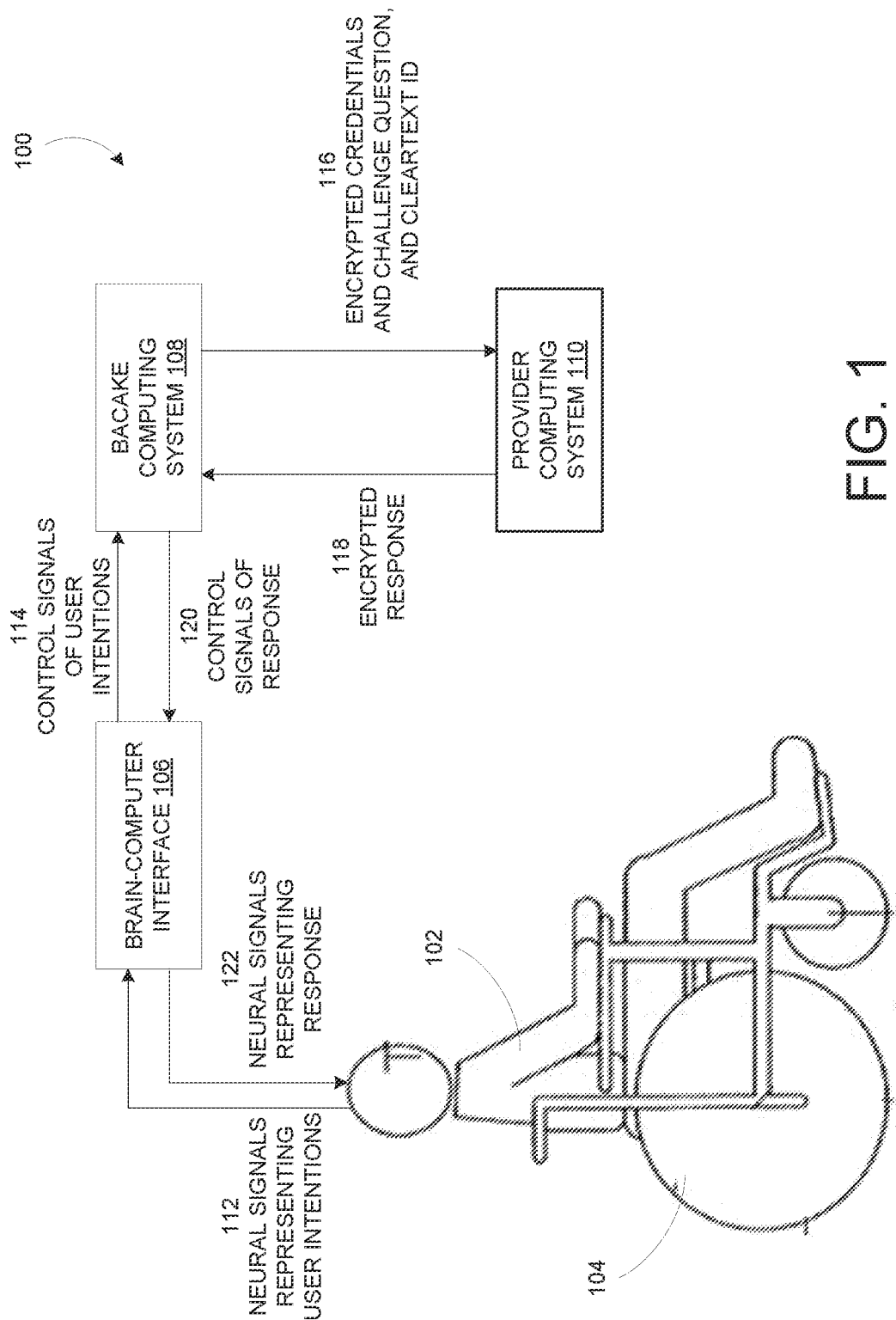
FIG. 1 is a functional block diagram of a BACAKE authentication system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Researchers have shown that noninvasively recorded electric brain activity can be used to voluntarily control switches and communication channels. Use of brain-actuated techniques can provide near-totally paralyzed individuals the ability to communicate using brain-actuated control ("BAC"). Neural data signals (e.g., EEG data) collected from a human brain through a scalp sensor array can be filtered to reduce noise and can be further decomposed into discrete, independent components.

Large EEG components that account for muscle or eye movements can be differentiated and grouped. This sorting process can be based on which scalp sensors detect such movements and on their relative signal strength and timing following a stimulus event. These components allow the intentions of an individual to be distinguished from one another and used as the basis for selecting between control choice alternatives, such as choosing between left and right.

EEG signals can be fed into a BCI to enhance the individual's ability to interact with the environment via a computer and through the use of only thought. BAC techniques allow the use of brain signals to make decisions, control objects, and communicate with the world using brain integration with peripheral devices and systems. For example, EEG signals representing thoughts of an individual imagining they are moving an object can be filtered and modeled using neural networks to classify the imaginary motions performed by the individual. These brain signals indicate the intent of the individual to perform some real act, such as moving their left hand or right foot. The individual's intended motions can be executed using physical devices through BCI-activated controls.

Various embodiments relate to a BACAKE system structured to facilitate strong, multi-factor and mutual authentication of an individual to a provider computing system via a BCI. The BACAKE system enables identity authentication and secure communication by leveraging the inventor's realization that human intentions manifested as electrical signals that emanate from the human brain can be treated as something-you-know authenticators. The BACAKE system relies on knowledge in the form of an individual's "intentions" mapped to "weak secrets" shared by communicating parties (e.g., the individual and the authentication system or access control system). The individual's intentions are extracted from data collected via a BCI. The collected intentions are then mapped to password substitution strings and used as a knowledge input (a "something-you-know" factor) to a PAKE protocol to facilitate mutual authentication. For example, collected intentions can include a series of hand gestures or dance steps that an individual utilizes as a proxy for a password.

The combination of knowledge-based cryptographic techniques with signals capable of noninvasive BAC of user interface or locomotive devices can allow motor-limited and locked-in individuals to securely authenticate their identities to a provider system and establish a secure channel for subsequent communications (e.g., to access healthcare or financial services).

According to an example embodiment, the BAKAKE system facilitates multi-factor and mutual authentication of an individual to a provider computing system via a brain-computer interface as follows. Neural signals are received from a brain-computer interface coupled to an individual. Physical movement intentions of the individual are extracted from the neural signals. The physical movement intentions are mapped to a character string representing a knowledge factor. A secure, mutually authenticated communication channel is established between the BACAKE computing system and a provider computing system by using encryption with a cryptographic key derived from the knowledge factor as an input to a PAKE protocol.

According to an example embodiment, the generating, by the BACAKE computing system establishes mutual authentication with the provider system as follows. A symmetric encryption key is generated using the knowledge factor as an input to a key exchange protocol. The BACAKE system encrypts a challenge question using the symmetric encryption key. The encrypted challenge question and a cleartext identifier of the individual are transmitted to the provider computing system. The provider computing system is configured to authenticate the individual using the encrypted challenge question and the cleartext identifier of the individual. In some embodiments, the BACAKE computing system also encrypts credentials of the individual (e.g., the knowledge factor) using the symmetric encryption key, and transmits to the provider computing system the encrypted credentials.

The provider computing system authenticates the individual as follows. A stored copy of the knowledge factor is retrieved based on the cleartext identifier of the individual. The symmetric key is derived using the knowledge factor as an input to the key exchange protocol. The encrypted challenge question is decrypted using the symmetric key, and a challenge response to the challenge question is prepared. The challenge response is encrypted using the symmetric key and is transmitted to the individual via the BACAKE computing system. In some embodiments, the encrypted credentials of the individual include the encrypted knowledge factor. In such embodiments, the provider computing system also decrypts the encrypted knowledge factor and verifies that the decrypted knowledge factor received from the BACAKE computing system matches the retrieved stored copy of the knowledge factor so as to provide an additional level of authentication.

The BACAKE computing system receives the encrypted challenge response from the provider computing system, and decrypts the encrypted challenge response using the symmetric encryption key. The decrypted challenge response is verified so as to authenticate the provider computing system.

In some embodiments, the BACAKE computing system is configured to facilitate multi-factor authentication of the individual. For example, some embodiments facilitate authentication via a biometric (a "something-you-are") authentication factor. For example, in one embodiment, a biometric sample captured from the individual is encrypted using the symmetric encryption key and is transmitted to the provider computing system. The provider computing system decrypts the encrypted biometric sample and matches the decrypted biometric sample with a biometric reference template associated with the individual so as to provide two-factor authentication of the individual. In some embodiments, the biometric sample is captured from the neural signals. In other embodiments, the biometric sample is captured from a biometric sensor.

In some embodiments, the BACAKE computing system is also configured to facilitate multi-factor authentication of the individual using a possession (a "something-you-have") authentication factor. For example, in some embodiments, the possession factor is a unique identifier stored securely in hardware registered with the provider computing system as belonging to the individual. For example, the unique identifier may be an identifier of the BCI device. Similar to the other authentication factors described herein, the unique identifier is encrypted using the symmetric encryption key before being transmitted to the provider computing system. This additional authentication factor can be used instead of or in addition to other authentication factors.

The BACAKE system solves various technical problems associated with authentication systems. For example, one challenge with BCI systems is establishing secure access between the individual and the device. For example, a hacker may attempt to transmit malicious control signals to the device actuators in order to cause the device to behave in a manner unintended by the individual. Similarly, a hacker may intercept and manipulate signals between the BCI and the device. Potential risk exposure is amplified if the device is remote from the individual or being remotely managed from an external control device, such as a device managed from a cloud system as an internet-of-things ("IoT") device.

The BACAKE system enables the individual and a remote computing system to mutually authenticate each other and establish a secure channel for communication.

FIG. 1 is a functional block diagram of a BACAKE authentication system 100, according to an example embodiment. The BACAKE authentication system 100 includes an individual 102, a physical assistance device 104, a BCI 106, a BACAKE computing system 108, and a provider computing system 110. The BACAKE authentication system 100 is configured to facilitate mutual authentication between the individual 102 and the provider computing system 110 by mapping neural signals from the individual 102 to character string representing a knowledge factor, which is used as an input to a PAKE protocol.

At 112, neural signals representing the individual's 102 intentions are captured from the individual 102 by the BCI 106. The BCI 106 analyzes and processes the received neural signals to generate control signals representing the individual's 102 intentions.

According to various embodiments, it should be understood that as a prerequisite to 112, the individual 102 must first enroll the knowledge factor with the provider computing system 110. For example, according to an embodiment, enrollment includes the individual 102 repeating his or her desired intentions (e.g., a certain pattern of movement) a sufficient number of times such that the BACAKE computing system 108 can reliably detect the desired intentions. The desired intentions are captured by the BACAKE computing system 108 and converted to the same character string for use in subsequent authentication attempts. In some embodiments, enrollment is completed remotely if the user credentials (e.g., the weak secret) can be transferred securely to the provider computing system 110 (e.g., using the provider computing system 110's public key to encrypt the user credentials).

At 114, the BCI 106 transmits the control signals representing individual's 102 intentions to the BACAKE computing system 108. The BACAKE computing system 108 maps the control signals representing individual's 102 intentions to a character string representing a knowledge factor. The BACAKE computing system 108 generates a symmetric encryption key using the knowledge factor as an input to a key exchange protocol (e.g., Diffie-Hellman). The BACAKE computing system 108 encrypts credentials of the individual 102 and a challenge question using the symmetric encryption key.

At 116, the encrypted credentials, the encrypted challenge question, and a cleartext identifier of the individual 102 are transmitted from the BACAKE computing system 108 to the provider computing system 110. The provider computing system 110 retrieves a stored copy of the knowledge factor based on the cleartext identifier of the individual 102. The provider computing system 110 derives the symmetric key using the knowledge factor as an input to the key exchange protocol. The provider computing system 110 decrypts the encrypted credentials using the symmetric key and verifies the credentials. The individual 102 is authenticated by the provider computing system 110 in response to the provider computing system 110 (1) successfully decrypting the encrypted credentials (indicating that the correct weak password was used to generate the symmetric encryption key); and (2) verifying that the credentials match previously-enrolled credentials associated with the identifier of the individual 102. The provider computing system 110 also decrypts the encrypted challenge question, formulates a response thereto, and encrypts the response using the symmetric key. In some embodiments, the response includes what the individual 102 sent as a challenge. The response message may be structured differently or may otherwise include other information so that the response message is different than the message sent to the provider computing system 110 including the encrypted challenge question.

At 118, the encrypted response to the challenge question is transmitted from the provider computing system 110 to the BACAKE computing system 108. The BACAKE computing system 108 decrypts the encrypted challenge response using the symmetric encryption key and verifies that the challenge response matches an expected challenge response. The provider computing system 110 is authenticated by the individual 102 in response to the individual 102 verifying that the challenge response matches the expected challenge response.

At 120, the BACAKE computing system 108 transmits response control signals to the BCI 106. The BACAKE computing system 108 generates the response control signals for use by the BCI 106 to facilitate verification that the challenge response matches the expected challenge response.

At 122, neural signals representing the challenge response are transmitted from the BCI 106 to the individual 102. The BCI 106 generates the neural signals based on the response control signals received at 120. The individual 102 verifies whether the response matches the expected challenge response. For example, the neural signals may cause the individual 102 to visualize an image or may incite an intention to move physically in a particular manner. In response to verifying the challenge response, the individual 102 transmits a verification indication to the BCI 106. The provider computing system 110 is authenticated by the individual 102 in response to the individual 102 verifying that the challenge response matches the expected challenge response.

Figure 2:
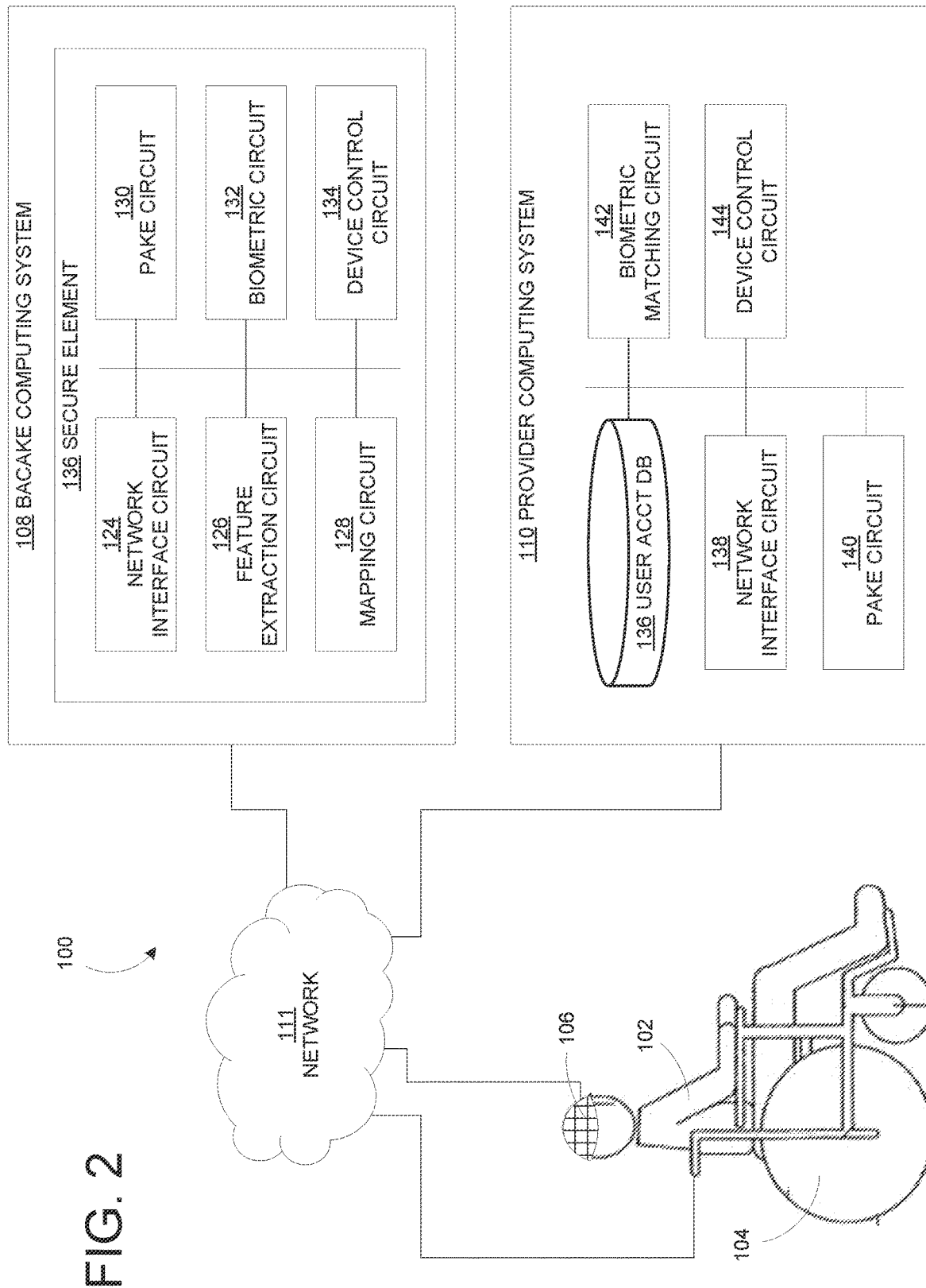
FIG. 2 is a schematic block diagram of the BACAKE authentication system of FIG. 1, according to an example embodiment.

FIG. 2 is a schematic block diagram of the BACAKE authentication system 100 of FIG. 1, according to an example embodiment. As shown in FIG. 1, the BACAKE authentication system 100 includes the individual 102, the physical assistance device 104, the BCI 106, the BACAKE computing system 108, and the provider computing system 110. The various systems and devices are operatively and communicatively coupled through a network 111, which may include one or more of the Internet, cellular network, Wi-Fi, Wi-Max, a proprietary banking network, or any other type of wired or wireless network or a combination of wired and wireless networks.

The individual 102 is any person who desires to establish a secure, mutually authenticated communication channel with a remote computing system, such as the provider computing system 110. The individual 102 may, but need not be disabled in some manner. For example, the individual 102 may be paralyzed and may not be capable of typing on a keyboard or touch screen device. In other embodiments, the BACAKE computing system 108 is utilized in connection with operation of a device that does not facilitate conventional data entry, such as a virtual reality ("VR") or augmented reality ("AR") headset. The BACAKE authentication system 100 enables the individual 102 to mutually authenticate with the provider computing system 110 using the individual's intentions (e.g., an intended pattern of motion) as a knowledge factor that is inputted into a PAKE protocol.

The physical assistance device 104 is any device that assists the individual 102 in his or her daily life. For example, the physical assistance device 104 may be a wheelchair, prosthetic device, exoskeleton, or other type of device. In some embodiments, the physical assistance device 104 includes a controller that controls its operation. In certain embodiments, the controller is in operative communication with the provider computing system 110, which transmits operational commands to the physical assistance device 104 to cause the physical assistance device 104 to perform a desired operation. In some embodiments, the BACAKE authentication system 100 includes a mental assistance device rather than the physical assistance device 104. For example, in some embodiments, an AR or VR device is used instead of the physical assistance device 104.

In some embodiments, the physical assistance device 104 includes other types of sensors, such as biometric sensors (e.g., fingerprint, voice, and retina sensors), motion detection sensors, and other types of sensors configured to capture an input from the individual 102. In some embodiments, the physical assistance device 104 also includes an output device, such as a speaker, a vibration device, etc. configured to provide feedback to the individual 102 and/or to cause movement of the individual 102.

The BCI 106 is operatively coupled to the individual 102. For example, in some embodiments, the BCI 106 includes an array of sensors (e.g., EEG sensors) embedded in a hat-like object that the individual 102 can wear on his or her head. In other embodiments, the BCI 106 is remote from the individual 102 and detects remotely input from the individual 102. The BCI 106 is configured to provide a direct communication pathway between the individual's 102 brain and an external device (e.g., the physical assistance device 104 via operative communication with the BACAKE computing system 108) that enables signals from the brain to control the device. The individual's 102 intentions are extracted from data collected using BCI techniques, such as using EEG sensors.

The BACAKE computing system 108 includes a network interface circuit 124, a feature extraction circuit 126, a mapping circuit 128, a PAKE circuit 130, a biometric circuit 132, and a device control circuit 134. In some embodiments, the BACAKE computing system 108 is integrated into the BCI 106. In other embodiments, the BACAKE computing system 108 is integrated with or coupled to the physical assistance device 104. In some embodiments, the BACAKE computing system 108 is implemented via an application on a mobile computing device.

The network interface circuit 124 includes, for example, hardware and associated program logic that connects the BACAKE computing system 108 to the network 111 to facilitate operative communication with the BCI 106 and the provider computing system 110. The network interface circuit 124 may facilitate communication using any combination of wired and/or wireless connections. For example, in one embodiment, the network interface 124 is connected to the BCI 106 via a wired connection.

The feature extraction circuit 126 is configured to extract the individual's 102 intentions from the neural signals received from the BCI 106. In some embodiments, the feature extraction circuit 126 is first "trained" by measuring the neural response of an individual imagining certain physical movements or images. The neural response is characterized based on multiple neural signal samples to identify the particular characteristics of the neural signals associated with that particular physical movement or intention of the individual 102.

The mapping circuit 128 is configured to map the individual's 102 intentions to a character string.

The PAKE circuit 130 is configured to generate encryption keys, encrypt information, and decrypt information, as set forth herein, in order to facilitate mutual authentication with the provider computing system 110.

The biometric circuit 132 is structured to receive biometric samples acquired from the individual 102. In some embodiments, the biometric circuit receives the biometric samples from a biometric sensor (e.g., fingerprint scanner, microphone, camera, etc.). In other embodiments, the biometric circuit 132 is configured to extract biometric samples from the neural signals captured by the BCI 106.

The device control circuit 134 is structured to controllably enable and disable operation of the physical assistance device 104. For example, in some embodiments, the device control circuit 134 defaults to a disabled condition and enables operation of the physical assistance device only in response to establishing a secure communication channel between the BACAKE computing system 108 and the provider computing system 110. The device control circuit 134 prevents malicious actors from obtaining unauthorized control of the physical assistance device 102.

The provider computing system 110 includes a user account database 136, a network interface circuit 138, a PAKE circuit 140, a biometric matching circuit 142, and a device control circuit 144.

The user account database 136 includes various information associated with individuals who have established accounts with the provider computing system 110. For example, the individual 102 may create an account with the provider computing system 110 and establish credentials, such as a unique user identifier (e.g., username) and password. The user account database 136 stores the user identifier and a hash of the password in the user account database 136. The user account database 136 can also store a biometric reference template associated with the user identifier of the individual 102 that is generated when the individual 102 enrolls in biometric authentication with the provider computing system 110.

The network interface circuit 138 includes, for example, hardware and associated program logic that connects the provider computing system 110 to the network 111 to facilitate operative communication with the BACAKE computing system 110.

The PAKE circuit 140 is configured to generate encryption keys, encrypt information, and decrypt information, as set forth herein, in order to facilitate mutual authentication with the BACAKE computing system 108.

The biometric matching circuit 142 compares one or more biometric samples received from the BACAKE computing system 108 to stored biometric reference templates using a biometric matching algorithm to determine if the biometric samples match the biometric reference template associated with the identifier of individual from which the biometric samples were retrieved. If the biometric sample matches the reference template, then biometric authentication is established. If the biometric sample does not match the reference template, then biometric authentication is not established.

The device control circuit 144 is structured to transmit control signals to the physical assistance device 104 in certain embodiments. For example, in some embodiments, the device control circuit 144 controls all or part of the operation of the physical assistance device 104. In these embodiments, it becomes apparent how critical it is to establish mutual authentication between the individual 102 and the provider computing system 110 in order to prevent a malicious actor from controlling the physical assistance device 104 in an unauthorized manner.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server).

To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
extracting, by a computing system, movement intentions of an individual from neural signals;
mapping, by a secure element of the computing system, the movement intentions to a character string; and
generating, by the computing system, a symmetric encryption key using the character string as an input to a key exchange protocol.

2. The method of claim 1, further comprising:
receiving, by the computing system, a biometric sample captured from the individual;
encrypting, by the computing system, the biometric sample using the symmetric encryption key; and
transmitting, by the computing system, the encrypted biometric sample to a provider computing system, the provider computing system configured to decrypt the encrypted biometric sample and match the decrypted biometric sample with a biometric reference template associated with the individual so as to provide two-factor authentication of the individual.

3. The method of claim 1, further comprising:
establishing, by the computing system, an authenticated communication channel between the computing system and a provider computing system by using the character string as an input to a password authenticated key exchange protocol.

4. The method of claim 3, wherein the establishing the authenticated communication channel comprises:
encrypting, by the computing system, credentials of the individual and a challenge question using the symmetric encryption key;
transmitting, by the computing system, the encrypted credentials, the encrypted challenge question, and a cleartext identifier of the individual to the provider computing system, the provider computing system configured to authenticate the individual using the encrypted credentials, the encrypted challenge question, and the cleartext identifier of the individual;
retrieving, by the computing system, an encrypted challenge response;
decrypting, by the computing system, the encrypted challenge response using the symmetric encryption key; and
verifying, by the computing system, the decrypted challenge response so as to authenticate the provider computing system.

5. The method of claim 4, further comprising:
encrypting, by the computing system, a unique identifier of a brain-computer interface coupled to the individual using the symmetric encryption key; and
transmitting, by the computing system, the encrypted unique identifier to the provider computing system, the provider computing system configured to decrypt the encrypted unique identifier and verify that the decrypted unique identifier matches a stored unique identifier associated with the cleartext identifier of the individual so as to provide two-factor authentication of the individual.

6. The method of claim 1, further comprising:
extracting, by the computing system, a biometric sample from the neural signals;
encrypting, by the computing system, the biometric sample using the symmetric encryption key; and
transmitting, by the computing system, the encrypted biometric sample to a provider computing system, the provider computing system configured to decrypt the encrypted biometric sample and match the decrypted biometric sample with a biometric reference template associated with the individual so as to provide two-factor authentication of the individual.

7. The method of claim 6, further comprising:
disabling, by the computing system, operation of a device operatively coupled to the computing system; and
enabling, by the computing system, operation of the device in response to the authenticating of the provider computing system.

8. A system comprising:
a computing system comprising:
a feature extraction circuit configured to extract movement intentions of an individual from neural signals;
a mapping circuit structured to map the movement intentions to a character string; and
a password authenticated key exchange circuit structured to:
generate a symmetric encryption key using the character string as an input to a key exchange protocol.

9. The system of claim 8, further comprising a biometric circuit configured to receive a biometric sample captured from the individual, wherein the password authenticated key exchange circuit is further configured to:
encrypt the biometric sample using the symmetric encryption key; and
transmit the encrypted biometric sample to a provider computing system, the provider computing system configured to decrypt the encrypted biometric sample and match the decrypted biometric sample with a biometric reference template associated with the individual so as to provide two-factor authentication of the individual.

10. The system of claim 9, wherein the biometric sample is extracted from the neural signals.

11. The system of claim 8, wherein the password authenticated key exchange circuit is further structured to:
establish an authenticated communication channel between the computing system and a provider computing system by using the character string as an input to a password authenticated key exchange protocol.

12. The system of claim 11, wherein the password authenticated key exchange circuit is further structured to:
encrypt credentials of the individual and a challenge question using the symmetric encryption key;
transmit the encrypted credentials, the encrypted challenge question, and a cleartext identifier of the individual to the provider computing system, the provider computing system configured to authenticate the individual using the encrypted credentials, the encrypted challenge question, and the cleartext identifier of the individual;
retrieve an encrypted challenge response;
decrypt the encrypted challenge response using the symmetric encryption key;
verify the decrypted challenge response so as to authenticate the provider computing system; and establish the authenticated communication channel with the provider computing system in response to verifying the decrypted challenge response.

13. The system of claim 12, wherein the password authenticated key exchange circuit is further configured to:
encrypt a unique identifier of a brain-computer interface using the symmetric encryption key; and
transmit the encrypted unique identifier to the provider computing system, the provider computing system configured to decrypt the encrypted unique identifier and verify that the decrypted unique identifier matches a stored unique identifier associated with the cleartext identifier of the individual so as to provide two-factor authentication of the individual.

14. The system of claim 13, wherein the password authenticated key exchange circuit is further configured to:
encrypt a biometric sample captured from the individual using the symmetric encryption key; and
transmit the encrypted biometric sample to the provider computing system, the provider computing system configured to decrypt the encrypted biometric sample and match the decrypted biometric sample with a biometric reference template associated with the individual so as to provide three-factor authentication of the individual.

15. The system of claim 13, further comprising a device control circuit operatively coupled to a physical assistance device, the device control circuit configured to:
disable operation of the physical assistance device; and
enable operation of the physical assistance device in response to the password authenticated key exchange circuit authenticating the provider computing system.

16. The system of claim 12, wherein the encrypted challenge response relates to an image, wherein the system further comprises a network interface circuit configured to transmit second neural signals representing the image, and wherein the password authenticated key exchange circuit is further configured to receive an input from the individual signifying that the image is an expected image associated with the provider computing system so as to verify of the decrypted challenge response.

17. A non-transitory computer-readable media having computer-executable instructions embodied therein that, when executed by a computing system, causes the computing system to perform operations comprising:
extracting movement intentions of an individual from neural signals;
mapping the movement intentions to a character string; and
generating a symmetric encryption key using the character string as an input to a key exchange protocol.

18. The non-transitory computer-readable media of claim 17, wherein the operations further comprise:
establishing an authenticated communication channel between the computing system and a provider computing system by using the character string as an input to a password authenticated key exchange protocol.

19. The non-transitory computer-readable media of claim 18, wherein the establishing the authenticated communication channel comprises:
encrypting credentials of the individual and a challenge question using the symmetric encryption key;
transmitting the encrypted credentials, the encrypted challenge question, and a cleartext identifier of the individual to the provider computing system, the provider computing system configured to authenticate the individual using the encrypted credentials, the encrypted challenge question, and the cleartext identifier of the individual;
retrieving an encrypted challenge response;
decrypting the encrypted challenge response using the symmetric encryption key; and
verifying the decrypted challenge response so as to authenticate the provider computing system.

20. The non-transitory computer-readable media of claim 18, the operations further comprising:
retrieving a biometric sample captured from the individual;
encrypting the biometric sample using the symmetric encryption key; and
transmitting the encrypted biometric sample to the provider computing system, the provider computing system configured to decrypt the encrypted biometric sample and match the decrypted biometric sample with a biometric reference template associated with the individual so as to provide two-factor authentication of the individual.

* * * * *